E. I. DODDS.
RECIPROCATING ELECTRIC MOTOR OR ENGINE.
APPLICATION FILED JAN. 22, 1913.
1,237,181. Patented Aug. 14, 1917.
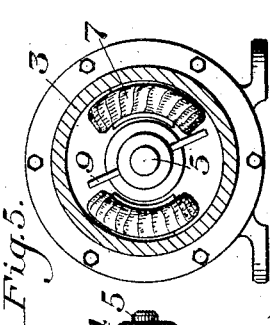
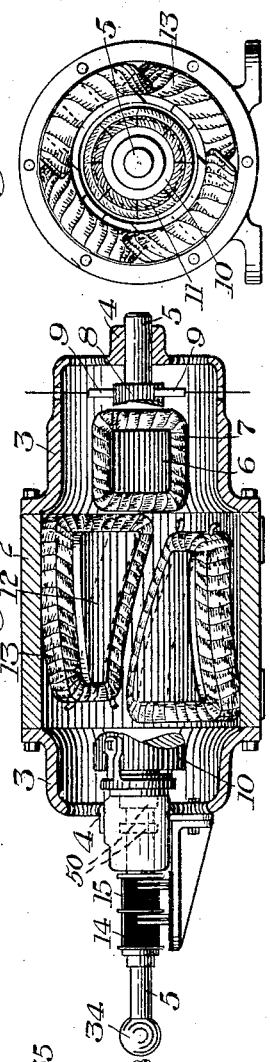
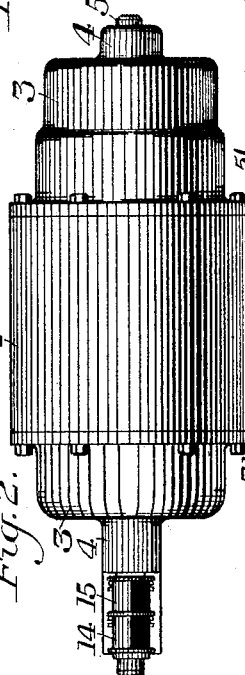
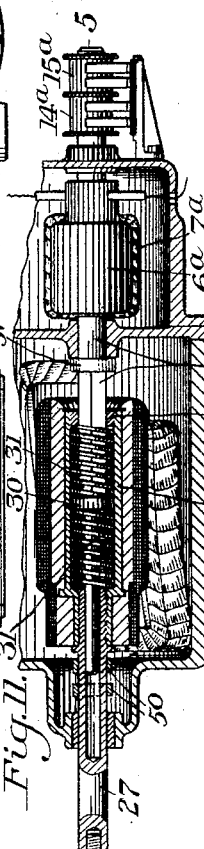
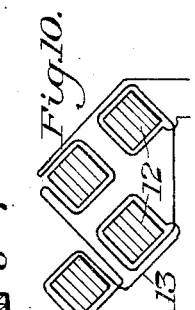
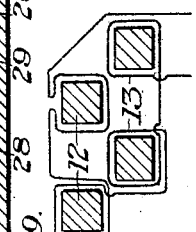
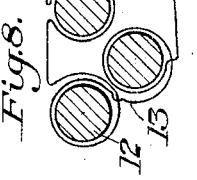
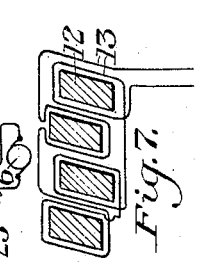
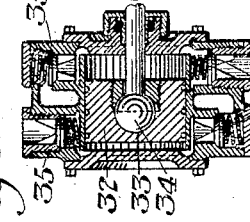
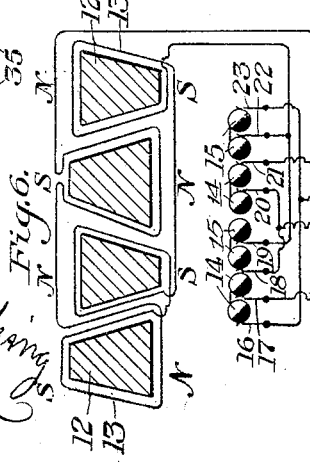
WITNESSES:
F. H. Budking
Alvin C. Spindler
INVENTOR
Ethan I. Dodds

UNITED STATES PATENT OFFICE.

ETHAN I. DODDS, OF CENTRAL VALLEY, NEW YORK.

RECIPROCATING ELECTRIC MOTOR OR ENGINE.

1,237,181. Specification of Letters Patent. Patented Aug. 14, 1917.

Application filed January 22, 1913. Serial No. 743,539.

*To all whom it may concern:*

Be it known that I, ETHAN I. DODDS, a citizen of the United States, residing at Central Valley, Orange county, New York, have invented a new and useful Improvement in Reciprocating Electric Motors or Engines, of which the following is a full, clear, and exact description, reference being had to the accompanying drawings, forming part of this specification, in which—

Figure 1 is a longitudinal section of a motor or engine embodying my invention, with a portion of the armature broken away; Fig. 2 is a side elevation of the same; Fig. 3 is a sectional view illustrating one form of air pump or compressor which may be operated by the motor or engine; Figs. 4 and 5 are end views, looking at opposite ends of the motor or engine with the end members of the casing removed; Fig. 6 is a wiring diagram showing the electric circuits of the motor or engine; Figs. 7, 8, 9 and 10 are diagrams illustrating different forms and arrangements of the pole pieces and are extended or developed views; and Fig. 11 is a longitudinal section of a portion of a motor and showing a modification.

My invention has relation to reciprocating electric motors or engines. The invention is designed to provide a reciprocating electric motor, which may be used for a variety of purposes, but which is particularly well adapted for operating air pumps or compressors, such as those employed upon electrically propelled vehicles for providing the supply of compressed air for the air brakes of the vehicles.

In reciprocating electric motors or engines with which I have been familiar prior to my invention, there has been an undue heating of the parts due to the action of the magnetic flux produced, and no satisfactory means have been provided for taking care of the flux and preventing its heating effect. In my improved motor or engine, the reciprocation of the movable element is effected by the interaction of a suitably arranged armature and field. The rotation of the reciprocating element is effected by means of an auxiliary rotary motor. This rotary movement of the reciprocating element is utilized to reverse the polarity of the field which produces the reciprocation. I also employ a novel arrangement of armature and field for effecting the reciprocating movement.

The precise nature of my invention will be best understood by reference to the accompanying drawings, which will now be described, it being premised, however, that the invention is susceptible of various other embodiments and that the details of construction and arrangement may be widely changed without departing from the spirit and scope of my invention as defined in the appended claims.

In this drawing, the numeral 2 designates a suitable casing having the removable end members or caps 3, which carry suitable bearings 4 for the reciprocating shaft 5. This cap is provided within one of the end members with an armature 6, shown as of the drum type, and with coöperating field magnets 7, whereby rotation of the shaft is effected as it is reciprocated. 8 designates the commutator, and 9 the commutator brushes for this motor.

The shaft also carries another armature 10 within the main body of the casing, and which may be circularly wound as shown in Fig. 11 and having a winding 11. Surrounding this armature, the casing carries a plurality of pole pieces 12, each of which has a winding 13. The windings 13 are so connected, as shown in Fig. 6, as to cause the adjacent pole pieces 12 to be of opposite polarity. Adjacent pole pieces are also arranged in staggered relation to each other in any one of a number of different ways, as shown in Figs. 6 to 10, inclusive. In Fig. 6 these pole pieces are shown as being of wedge form longitudinally, adjacent pieces being placed reversely, and each pole piece being offset with respect to the adjacent ones, in the manner indicated. In Fig. 7 the pole pieces are of rhomboidal form in section, and are similarly offset. In Fig. 8 they are shown as of circular section; in Fig. 9 of rectangular section; and in Fig. 10 as of lozenge-shape in section.

The windings 13 are connected in series with each other, and also in series with the armature winding 11. Secured to the armature 10 to rotate therewith, and surrounding the shaft 4, is a commutator having two commutating portions 14 and 15. Each of these commutating portions is shown as having a half segment of non-conducting material, and the remaining half segment of conducting material. Each of the commutators 14 and 15 is engaged by four brushes. These brushes are designated in Fig. 6 as 16, 17, 18, 19, 20, 21, 22 and 23. The brushes 16 and 23 are connected in multiple with one side of the supply circuit 24. The two brushes 18 and 20 are connected in multiple with the other side of said supply circuit through the armature winding 11. The two brushes 17 and 21 are connected in multiple with one side of the field windings 13, and the two brushes 19 and 22 are connected in multiple with the other side of said field windings. The two commutators and their respective brushes are so arranged that when the brushes 20 and 21 of the commutator 14 are in engagement with the conducting segment of that commutator, the brushes 22 and 23 of the commutator 15 make contact with the conducting segments of commutator 15, and vice versa, a partial rotation of the shaft 5 being sufficient to throw one set of brushes out of circuit, and the other set of brushes into circuit, and in this manner reverse the current through the field windings 13. Thus, for instance, considering the two brushes 16 and 23 which are connected in multiple with one side of the supply circuit: In the position of the commutators shown in Fig. 6, it will be seen that the current cannot pass by way of the brush 16, as that brush is on an insulated commutator portion. It must therefore pass by way of the brush 23 and thence to the field windings 13 by means of the brush 22. If, now, the commutators be shifted so that the brush 23 is on an insulated portion and the brush 16 on a conducting portion, then the current will pass to the field windings by way of the brush 17 (which is also now on a conducting portion of the commutator).

Fig. 6 also shows the circuit connection of the armature 6 and field windings 7 of the rotary motor. 25 designates a rheostatic control for this motor.

When the circuits illustrated in Fig. 6 are energized, the interaction between the magnetic fields produced by the field windings 13 and the armature 10 causes an endwise movement of the armature relatively to the field, this endwise movement being reversed, so as to produce a rapid reciprocating movement, at each reversal of current in the windings 13. This endwise reciprocation of the armature is caused, as will be readily seen, from the peculiar staggered offset arrangement of the pole pieces, whereby the lines of force passing between adjacent pole pieces are caused to take paths oblique to the longitudinal axis of the armature. As shown in cross section in Fig. 11, the armature is wound with a continuous winding, the individual coils of which are circular and lie in planes normal to the axis of the armature, like the ordinary winding of a magnet or a solenoid. The mechanical force which is exerted at right angles to the current-carrying wire is therefore effectively applied to reciprocate the armature.

It is well known that in an ordinary motor, in which the poles happen to be offset longitudinally with respect to the axis of the armature, the armature will vibrate or "hunt" rapidly back and forth longitudinally. This same action takes place in the armature of the present reciprocating motor, and is accentuated by the inter-action of the fields, through which the current is periodically reversed, and the armature windings, the wire in which is at right angles to the endwise movement of the armature. When the armature is at one extreme position, the fields tend to draw it to a middle or neutral position with respect to the field. Since the fields are offset and the armature at its extreme position has more of its windings located opposite one set of field pole pieces than the other, there will be, as a result, a mechanical thrust tending to drive the armature longitudinally. As the armature moves, its coils cut the lines of force of the field, generating a back electromotive force which is overcome by the electromotive force of the generator, converting electrical into mechanical energy. After the armature has passed its middle position and is moving toward its opposite extreme position, the armature comes opposite the other set of pole pieces, and the direction of flow of the current through the armature is such that there is a tendency to check the movement of the armature, thus cushioning the end of its movement and converting mechanical into electrical energy. When the armature reaches its other extreme position, the direction of flow of the current is reversed and the same operation is repeated. I overcome one of the difficulties heretofore inherent in reciprocating electric motors or engines, and I am able to produce a reciprocating electric motor or engine possessing a high degree of efficiency.

In the modification shown in Fig. 11, the arrangement is generally similar to that before described, but the commutators 14ª and 15ª which control the field winding 13 are placed on the tail end of the shaft 5 instead of at the front end of the casing. In this form I have also shown the shaft of the motor as formed in two sections, one section 26 which carries the armature 6ª of the rotary motor, and which section is non-reciprocating; and a reciprocating forward section 27, which telescopes over the end of the section 26. The reciprocating shaft section 27 has attached thereto a cylindrical casing 28 within and secured to the armature. The rear end of said casing has a bushing 29 secured therein, the bushing having an angular opening, which is engaged by a squared or angular portion of the shaft section 26. Within the casing 28, the shaft section 26 carries a collar 30; and between this collar and each end of the casing is seated a helical spring 31.

The armature, together with the shaft section 27, is reciprocated in the manner first described, the casing 28 sliding on the squared portion of the shaft 26, and the latter acting to rotate the armature. The springs 31 act as cushioning or steadying springs to prevent hammering of the armature, each of these springs being placed alternately in compression and tension as the armature reciprocates.

Slip rings for the armature are indicated at 50. A thrust collar for the rotor is indicated at 51.

As above stated, my invention provides an electric motor or engine capable of a wide variety of uses. The number of moving parts is reduced to a minimum, and the weight and inertia of these parts is also reduced to a minimum. In Fig. 3 I have shown a form of air compressor or pump which the engine or motor may be employed to operate. In this figure, 32 is the reciprocating piston, which is provided with a socket 33 loosely engaged by a ball 34 on the forward end of the shaft 4. 35 designate the valves of the pump or compressor. The motor is particularly adapted to the driving of pumps or compressors, as its shaft can be directly connected, thus doing away with cranks, pitmen, etc.

What I claim is:—

1. A reciprocating electric motor having a reciprocating element, electro-magnetic means for effecting a reciprocation of the element, a motor for rotating the element as it is reciprocated, and commutating means controlled by the rotary movement of the element for controlling the action of the electro-magnetic means; substantially as described.

2. A reciprocating electric motor, comprising a reciprocating shaft member, an armature secured thereto, field magnets coacting with said armature to produce a reciprocation thereof, a motor for rotating the shaft and armature, and commutating means also operated by the last named motor for controlling the said field magnets; substantially as described.

3. A reciprocating electric motor, comprising a stationary member and a reciprocating member, said members having coöperating windings, and one of said members having its poles arranged in staggered or offset relation to each other whereby the lines of force passing between adjacent poles are caused to take paths oblique to a plane perpendicular to the axis of the reciprocating member; substantially as described.

In testimony whereof, I have hereunto set my hand.

ETHAN I. DODDS.

Witnesses:
Geo. B. Bleming,
Geo. H. Parmelee.

Copies of this patent may be obtained for five cents each, by addressing the "Commissioner of Patents, Washington, D. C."